United States Patent Office 3,539,392
Patented Nov. 10, 1970

3,539,392
RESISTORS
Alan Gray Cockbain, Ilford, England, assignor to The Plessey Company Limited, Ilford, England, a British company
No Drawing. Filed June 12, 1967, Ser. No. 645,530
Claims priority, application Great Britain, June 14, 1966, 26,438/66
Int. Cl. C23c *3/00*
U.S. Cl. 117—227                12 Claims

ABSTRACT OF THE DISCLOSURE

Method of making a cermet glaze resistor comprises dissolving inorganic ingredients of a glaze in a solvent together with a precursor which will form a conductive constituent of the resistive glaze, coating the resulting solution on a substrate surface, treating the liquid by hydrolysis for example before or after this coating step to cause a separate phase to form, evaporating the solvent and firing the resulting deposit to form a resistive cermet glaze.

---

This invention relates to resistors. It relates specifically to resistors of the glaze or cermet glaze type in which a glaze or glassy medium either contains a metal oxide in solution rendering it conductive or which is used to suspend a finely divided electrical conductor or semiconductor such as a metal, a metal oxide or a metal associated with an oxide.

British patent specification No. 1,130,575, issued on our copending British application No. 47,854/64, describes the preparation of a resistive glaze in which the ingredients of the glaze and a conductive constituent are applied as a solution to form a thin coating on a substrate. The use of the solution is convenient for forming a glaze of particular low thickness. We have now found however, that if the medium to be deposited on a substrate as a precursor of the glaze is treated whilst it is liquid so as to cause a separate phase to form, prior to evaporation of the solvent satisfactory resistive glaze films of two microns or less in thicknesss may be produced.

According to one feature of the invention a method of making a resistor comprises dissolving the inorganic ingredients of a glaze in a solvent and additionally dissolving therein a precursor which will form a conductive constituent of a resistive glaze, the quantity of solvent being sufficient to form a clear solution, at least when heated to 90° C. coating the resulting liquid on to a substrate material, treating the liquid either before or after the coating step so as to cause a liquid or solid phase, containing said ingredients and said precursor, to separate, and then evaporating the solvent and firing the resulting deposit to form a resistive cermet glaze.

Preferably the solvent used is an organic solvent or mixture of solvents such as common alcohols, chlorinated hydrocarbons, ethers, terpenes etc. The fired glaze may be a lead borosilicate glass and the solution to produce this would thus contain compounds of lead such as the basic acetate, naphthenate, oleate, resinate or stearate compounds of boron such as triethylborate and compounds of silicon such as ethyl silicate. The compounds which upon heating will become converted to an electrical conductor may conveniently be an organometallic compound like a carboxylate, naphthenate, resinate etc., of the transition elements, particularly members of the platinum group such as palladium, platinum, rhodium, ruthenium and iridium, but also including nickel and gold.

The treatment of the liquid glaze forming solution may cause the further phase to separate as a dispersion, suspension or emulsion and thus some or all of the ingredients of the final glaze may be present in colloidal form. The reaction which is used to effect separation of this phase may include reduction, oxidation, carbonation, exsolution or crystallisation as well as hydrolysis. In a preferred embodiment hydrolysis is used since this enables the glaze forming liquid to be maintained at room temperature during the procesing and the reaction is thus enabled to be more controllable as well as giving greater convenience in carrying out this stage.

Ruthenium, rhodium and palladium have been found to be particularly suitable for conferring useful ranges of resistivity and temperature coefficient on such films.

A very wide range of glazes is suitable for the glaze base and a lead borosilicate glass composition for instance has been found to form a satisfactorily stable, adhesive and humidity resistant glaze film. The glaze may be formed by dissolving the precursors of a lead borosilicate glass in common solvents or mixtures of solvents such as alcohols (e.g. benzyl or diacetone alcohol) or esters (e.g. benzyl benzate). To this solution of glaze precursors solutions of resinates or other appropriate compounds of the selected platinum group metal or metals may be added together with any desired thickeners, screening preparations, or other additives that may be required to produce a mdium suitable for application to the substrate. The method of application may be by dipping, impregnating, spraying, screen printing etc., to the substrate. The treatment of the glaze forming liquid which will cause the further phase to separate may be by hydrolysis and conveniently this may be carried out by incorporating hydrolysing agents in the composition of the glaze forming liquid.

Suitable substrate materials for supporting the resistive film include alumina, steatite and borosilicate glass. It is not however essential that a substrate material be used and the glaze might for instance be cast into film or rod form where it will be of sufficient strength to support itself. Fibrous reinforcement material might be added to increase the strength of the resulting cast glaze body.

According to a further feature of the invention there is provided a process for the deposition of a resistive glaze film upon a non-conductive substrate.

The invention also includes the provision of an electrical resistor comprising a resistive film supported on a non-conductive substrate. The resistor may be used for purposes such as a potentiometer track, as a fixed resistor or resistive network for microcircuits and printed circuits and as a heating element.

According to yet a further feature of the invention there is provided a solution or emulsion from which a conductive glass film may be deposited, such a solution or emulsion may be used as a precursor to impregnate porous non-conducting refractory, ceramic or glass bodies and upon subsequently firing the impregnated body will leave a resistive glaze film coating the pore surfaces to form a resistive element.

By way of illustration, the invention will be further explained with reference to the following examples which illustrate use of particular metals of the platinum group.

To simplify the preparation of the different glaze mixes about to be described, three basic glaze compositions referred to during the experimental work as RP4, RP20 and RP21 were first made up by taking the following ingredients

|  | RP4 | RP20 | RP21 |
|---|---|---|---|
| Benzyl alcohol, milliliters | 40 | 40 | 16 |
| Lead stearate, grams | 24 | 24 | 9.6 |
| Silicon ester, milliliters | 5.5 | 5.8 | 2.8 |
| Triethyl borate, milliliters | 4.3 | 6.3 | 2.2 |

These ingredients were milled for two hours to ensure satisfactory blending together. The resulting creamy mix could then be used as a base for a glaze composition which could be readily hydrolyzed when required by passing it through a triple roll mill and when suitably milled adding one ml. of a solution of diacetone alcohol in 0.880 ammonium hydroxide in the proportion 2:1 by volume. This hydrolysed composition was then applied to a suitable substrate and fired to form a resistor.

As an alternative to the use of hydrolysis for causing a liquid or solid phase to separate from the glaze composition it was found that the latter at about 90° C. would form a clear liquid. When this liquid was poured onto the cold rolls of the triple roll mill a dispersion of particles was formed in the solution and this dispersion could then be used as the medium for coating the substrate. This illustration has been quoted to show that the invention is not limited to the use of hydrolysis as the means for causing separation of the further phase and other phenomena like exsolution and those already mentioned can also be effective.

In the formulae given for the glaze bases RP4, RP20 and RP21 it was found that in place of the benzyl alcohol, diacetone alcohol or benzyl benzoate could be used. In place of the lead stearate, bismuth octoate was also found to be a suitable ingredient of these preparations.

EXAMPLE 1

A glaze base was prepared by taking

Ruthenium trichloride: 0.2504 g.
24% lead naphthenate: 4.3068 g.
Triaryl borate: 2.0128 g.
Tetraethyl silicate: 1.3015 g.
Benzyl alcohol: 0.2504 g.
Stearic acid: 3.0001 g.
2:1 diacetone alcohol/0.880 ammonium hydroxide: 1.0 ml.

and milling these ingredients together to give a homogeneous mixture. The resulting composition was screen printed onto a substrtate of polished sintered alumina ceramic and fired in a steam-nitrogen atomsphere. The firing was carried out in an oven the temperature of which was raised to 700° C. in two hours and the substrate was then allowed to cool in the oven.

The glaze base that had been printed onto the substrate was found to have yielded a resistive film having a resistivity of about 10,000 ohms/square, a temperature coefficient of about +300/° C. and a zero voltage coefficient.

The benzyl alcohol ingredient of the glaze composition functions as a solvent for the ruthenium trichloride whilst the stearic acid is added to thicken the mixture for screening. Hydrolysis of the ethyl silicate and boron esters is rapidly accomplished by the solution of ammonium hydroxide in diacetone alcohol.

EXAMPLE 2

A different glaze base was prepared by taking

| | G. |
|---|---|
| Ruthenium trichloride | 0.2475 |
| 24% lead naphthenate | 4.3229 |
| Triaryl borate | 2.3780 |
| Triethyl borate | 0.4685 |
| Tetraethyl silicate | 1.3201 |
| Benzyl alcohol | 2.0701 |
| Stearic acid | 2.0114 |

2:1 diacetone alcohol/0.880 ammonium hydroxide 1.0 ml. milling these ingredients as before and screen printing the resulting composition on to an alumina substrate.

After firing a film was obtained having a resistivity of about 30,000 ohms/square, a temperature coefficient of about +200 p.p.m./° C. and a voltage coefficient of about 0.002%/volt.

EXAMPLE 3

A further formulation was prepared using a different metal of the platinum group in the following composition.

"Hanovia" 4% ruthenium resinate: 1.7333 g.
"Hanovia" 15% rhodium solution 6894: 0.7512 g.
RP4: 5.0018 g.
2:1 diacetone alcohol/0.880 ammonium hydroxide: 1.0 ml.

The name "Hanovia" is a registered trademark of Engelhard Industries Ltd. Valley Road, Cinderford, Gloucestershire, England.

These ingredients were milled together and the composition screen printed on to an alumina substrate.

After firing a film was obtained having a resistivity of about 600 ohms/square and a temperature coefficient of −175 p.p.m./° C.

EXAMPLE 4

Palladium, a further metal of the platinum group, was used in the following glaze composition.

Palladium acetate: 0.69 g.
24% lead naphthenate: 4.01 g.
Tetraethyl silicate: 0.6 ml.
Triethyl borate: 0.4 ml.
Diacetone alcohol: 1.0 ml.
0.880 ammonium hydroxide: 0.5 ml.
Stearic acid: 3.0 g.
Terpineol: 2.4 ml.

These ingredients were mixed, printed onto a substrate and fired as before. The resulting conductive glaze film had a sheet resistivity of 50,000 ohms/square.

EXAMPLE 5

RP4: 10 g.
"Hanovia" 15% rhodium solution 6894: 7.1 g.
Terpineol: 0.5 ml.
0.880 ammonium hydroxide: 1.0 ml.

Sheet resistivity 40,000 ohms/square, temperature coefficient of resistance −4500 p.p.m./° C.

EXAMPLE 6

RP4: 7.32 g.
"Hanovia" 4% ruthenium resinate: 1.53 g.
15% rhodium resinate: 0.69 g.
2:1 diacetone alcohol/0.880 ammonium hydroxide: 1.0 ml.

Sheet resistivity 3800 ohms/square.

EXAMPLE 7

RP20: 7.35 g.
"Hanovia" 40% ruthenium resinate: 1.55 g.
15% rhodium resinate: 0.69 g.
Manganese napththenate: 1.85 g.
2:1 diacetone alcohol/0.880 ammonium hydroxide: 1.0 ml.

Sheet resistivity 30,000 ohms/square.

EXAMPLE 8

RP4: 6.00 g.
4% calcium naphthenate: 1.06 g.
"Hanovia" 4% ruthenium resinate: 1.51 g.
15% rhodium resinate: 0.86 g.
2:1 diacetone alcohol/0.880 ammonium hydroxide: 1.0 ml.

Sheet resistivity 1000 ohms/square.

EXAMPLE 9

RP4: 5.00 g.
"Hanovia" 6% iridium resinate: 5.00 g.
2:1 diacetone alcohol/0.880 ammonium hydroxide: 1.0 ml.

Sheet resistivity 2400 ohms/square, temperature coefficient of resistance +50 p.p.m./° C.

EXAMPLE 10

Nickel acetate: 0.5 g.
Benzyl alcohol: 2.1 g.
Methyl alcohol: 1 ml.
Lead stearate: 0.65 g.
Tetraethyl silicate: 0.16 g.
Triethyl borate: 0.1 g.
2:1 diacetone alcohol/0.880 ammonium hydroxide: 1 ml.

These ingredients were milled together and the diacetone alcohol/0.880 ammonium hydroxide added last of all just before the composition was to be coated onto a substrate. After coating the substrate with the glaze layer it was fired at 700° C. for four minutes.

The glaze resistor which resulted from this process had a sheet resistivity of 3000 ohms/square, and temperature coefficient of resistance −3000 p.p.m./°. C.

EXAMPLE 11

Bright Platinum 6857: 1.0 g.
RP4: 2.0 g.
Methyl ethyl ketone: 2 ml.
Stearic acid: 2.0 g.
2:1 diacetone alcohol/0.880 ammonium hydroxide: 1 ml.

The Bright Platinum 6857 used for this composition was a product of Johnson Matthey & Co. Ltd., 78 Hatton Garden, London, E.C.1., England. These ingredients were mixed together and fired as described for Example 10. The resulting glaze resistor had a sheet resistivity of 10,000 ohms/square.

These examples show generally the preparation of glazes having high value of sheet resistivity and a further series of examples will be described which generally show low values of resistivity. In these further examples to facilitate application of the paint to a substrate by screen printing, a screening agent "Hanovia" Screening Agent 6633 was used. Silver oxide ($Ag_2O$) or gold oxide ($Au_2O$) was added to enable the resistivity to be reduced, since there is a limit to the minimum resistivity which is possible by adding more platinum group metal in solution.

In each of the following examples one ml. of 2:1 diacetone alcohol/0.880 ammonium hydroxide was added during the milling of each paint to effect hydrolysis. The value for sheet resistivity and temperature coefficient of resistance (TCR) are also shown.

TABLE 1

| Example: | RP21, g. | Screening agent, g. | $Ag_2O$, g. | 15% rhodium solution 6,894 g. | Terpineol, ml. | Resistivity, ohms/ square | TCR, p.p.m./ ° C. |
| --- | --- | --- | --- | --- | --- | --- | --- |
| 12 | 1.2091 | 1.6170 | 2.2193 | 2.5580 | 2.9 | 50 | +190 |
| 13 | 1.4409 | 1.5020 | 2.2053 | 2.3632 | 3.5 | 45 | +90 |
| 14 | 1.5438 | 1.5020 | 2.2053 | 2.3632 | 4.5 | 70 | +40 |
| 15 | 1.8755 | 1.6157 | 2.2687 | 2.8773 | 4.2 | 100 | −160 |
| 16 | 1.9480 | 1.6157 | 2.2687 | 2.8773 | 50 | 150 | −190 |

TABLE 2

| Example: | RP4, g. | Screening agent, g. | $Ag_2O$, g. | 15% rhodium solution 6,894 g. | Terpineol, ml. | Resistivity, ohms/ square | TCR, p.p.m./ ° C. |
| --- | --- | --- | --- | --- | --- | --- | --- |
| 17 | 1.0059 | 1.7832 | 2.0100 | 2.3262 | 4.0 | 4.5 | +620 |
| 18 | 0.9946 | 1.4977 | 1.9916 | 2.3415 | 2.0 | 8.5 | +100 |
| 19 | 1.5344 | 1.4369 | 1.9862 | 2.3757 | 2.5 | 43 | +80 |
| 20 | 2.0296 | 1.4369 | 1.9862 | 2.3757 | 2.5 | 100 | −1,700 |

TABLE 3

| Example: | RP4, g. | Screening agent, g. | $Au_2O$, g. | 15% rhodium solution 6,894 g. | Terpineol, ml. | Resistivity, ohms/ square | TCR, p.p.m./ ° C. |
| --- | --- | --- | --- | --- | --- | --- | --- |
| 21 | 0.9287 | 1.4623 | 1.0837 | 0.9326 | 1.0 | 21 | −120 |
| 22 | 1.8320 | 1.4623 | 1.0837 | 0.9326 | 1.0 | 32 | −440 |
| 23 | 2.4265 | 1.4623 | 1.0837 | 0.9326 | 1.0 | 130 | −1,300 |

TABLE 4

| Example: | RP4 g. | Screening agent, g. | $Ag_2O$, g. | 15% rhodium solution 6,894 g. | Terpineol, ml. | Zr octate, g. | Resistivity, ohms/ square |
| --- | --- | --- | --- | --- | --- | --- | --- |
| 24 | 0.9946 | 1.4977 | 1.9916 | 2.3415 | 2.0 | 0.3529 | 26 |
| 25 | 0.9946 | 1.4977 | 1.9916 | 2.3415 | 2.0 | 0.7015 | 85 |
| 26 | 0.9946 | 1.4977 | 1.9916 | 2.3415 | 2.0 | 1.0528 | 600 |

TABLE 5

| Example: | RP21 g. | Screening agent, g. | $Ag_2O$, g. | 15% rhodium solution 6,894 g. | Terpineol, ml. | Zr octate, g. | Resistivity, ohms/ square |
| --- | --- | --- | --- | --- | --- | --- | --- |
| 27 | 0.9903 | 1.4987 | 1.9992 | 2.3363 | 2.0 | 0.3502 | 12 |
| 28 | 0.9903 | 1.4987 | 1.9992 | 2.3363 | 2.0 | 0.6998 | 47 |
| 29 | 0.9903 | 1.4987 | 1.9992 | 2.3363 | 2.0 | 1.0489 | 150 |

The addition of zirconia was found to have a beneficial effect in improving the high temperature stability of the resistive glazes and this is illustrated in Tables 4 and 5.

The process of the invention has been found to enable thin resistive films of metal glaze or metal oxide to be readily produced upon suitable substrates. These films may be of the order of two microns or less in thickness and by choice of the conductive constituents of the glaze a wide range of resistivities can be obtained. The step of forming a separate phase in situ in the glaze which may take place after it has been deposited on the substrate enables the production of very fine suspensions of some or all of the ingredients of the glaze and these can be deposited free from trapped air or gas. The preparation of the additional phase in situ enables intimate contact between the glaze precursors and a substrate to be attained and it is believed also that advantages are secured by the enhanced reactivity of the newly formed oxides which are derived from decomposition and oxidation of their organometallic precursors. Since the glaze forming liquid is prepared initially as a solution or an emulsion there are no problems such as those of sedimentation or the suspension of powders of differing density associated with storage of this liquid and difficulties in preparing dispersions of liquids with finely divided solids are eliminated. The usual difficulties associated with preparation of finely divided materials by techniques such as grinding are also obviated.

The cermet glaze resistors formed by the process of the invention have been found to possess particularly good surface definition and this feature can be of special advantage for applications such as forming the resistive element in a potentiometer.

The foregoing description of embodiments of the invention have been given by way of example only and a number of modifications may be made without departing from the scope of the invention. For instance, instead of the separation of the liquid or solid phase from the solution of the glaze precursors being effected by hydrolysis, an alternative type of reaction such as reduction or crystallisation might be used. Additionally the glaze solution may be made to contain more than one phase—it could comprise an emulsion including suspended solid material for instance.

The invention is clearly also not limited to the use of a glaze of a lead borosilicate glass and other suitable glazes might be used as alternatives.

What I claim is:

1. A method of making a resistor comprising the steps of dissolving the inorganic ingredients of a glaze in a solvent, additionally dissolving therein a precursor which will form a conductive constituent of a resistive glaze, the quantity of solvent being sufficient to form a clear solution, at least when heated to 90° C., coating the resulting liquid on to a substrate material, treating the liquid either before or after the coating step so as to cause a liquid or solid phase containing said ingredients and said precursor to separate, and then evaporating the solvent and firing the resulting deposit to form a resistive cermet glaze.

2. A method as claimed in claim 1, which includes the step of adding a hydrolising agent to the solution that contains the said ingredients and said precursor so as to cause a phase containing said ingredients and said precursor to separate.

3. A method as claimed in claim 2, wherein ammonium hydroxide is used as the hydrolising agent.

4. A method as claimed in claim 2, wherein a solution of ammonium hydroxide in diacetone alcohol is used as the hydrolising agent.

5. A method as claimed in claim 1, in which the solvent is an organic solvent selected from a class consisting of a common alcohol, a chlorinated hydrocarbon, an ether and terpene.

6. A method as claimed in claim 1, in which the fired glaze is a lead borosilicate glass.

7. A method as claimed in claim 6, in which the lead borosilicate glass is formed from a solution containing a compound selected from a class consisting of a lead basic acetate, naphthenate, oleate, resinate and stearate.

8. A method as claimed in claim 6, in which the lead borosilicate glass is formed from a solution containing triethyl borate.

9. A method as claimed in claim 6, in which the lead borosilicate glass is formed from a solution containing ethyl silicate or a silicon ester.

10. A method as claimed in claim 1, in which the precursor which enables the glaze after firing to become electrically conductive comprises an organometallic compound.

11. A method as claimed in claim 10, in which the organometallic compound is a compound selected from a class consisting of a carboxylate, naphthenate or resinate of a metal.

12. A method as claimed in claim 11, in which the metal is one of a group consisting of palladium, platinum, rhodium, ruthenium, iridium, nickel and gold.

References Cited

UNITED STATES PATENTS

| | | | |
|---|---|---|---|
| 2,695,275 | 11/1954 | Gray | 117—227 X |
| 3,271,193 | 9/1966 | Boykin | 117—227 |

WILLIAM L. JARVIS, Primary Examiner

U.S. Cl. X.R.

117—124, 160; 252—514; 106—1